United States Patent [19]

Benkowski et al.

[11] 4,184,829
[45] Jan. 22, 1980

[54] APPARATUS FOR REPROCESSING SCRAP FROM FABRIC REINFORCED THERMOPLASTIC SHEET

[75] Inventors: William J. Benkowski, Jeannette, Pa.; Richard L. Fishel, Akron; Francis J. Maurer, Tallmadge, both of Ohio

[73] Assignee: The General Tire & Rubber Company, Akron, Ohio

[21] Appl. No.: 556,602

[22] Filed: Mar. 10, 1975

Related U.S. Application Data

[62] Division of Ser. No. 451,390, Mar. 15, 1974, abandoned.

[51] Int. Cl.² .................... B29B 1/04
[52] U.S. Cl. ............ 425/202; 425/DIG. 201
[58] Field of Search ........... 425/DIG. 200, DIG. 201, 425/202, 222, 217, 223, 224, 324 R, 335, 363, 110, 115, 517, 505, 317; 264/45.3, 45.9, 175, 137

[56] References Cited

U.S. PATENT DOCUMENTS

| | | | |
|---|---|---|---|
| 1,506,036 | 8/1924 | Willmarth | 425/202 X |
| 2,170,396 | 8/1939 | Banbury | 425/363 |
| 3,017,918 | 1/1962 | Maillard | 425/324 |
| 3,212,127 | 10/1965 | Flook et al. | 425/223 |
| 3,562,373 | 2/1971 | Logrippo | 264/118 |
| 3,564,085 | 2/1971 | Schickedanz | 264/45.3 |
| 3,607,999 | 9/1971 | Corbett | 425/202 |
| 3,936,258 | 2/1976 | Lake | 425/367 |
| 3,948,165 | 4/1976 | Seifert | 100/158 R |

*Primary Examiner*—Robert L. Spicer, Jr.

[57] ABSTRACT

A method and apparatus for reclaiming scrap produced in the manufacture of fabric reinforced thermoplastic resin sheet material so that the scrap may be worked, banded and calendered or extruded to form a finished product. The reclaiming or reworking of the material is made possible by first means for tearing the fabric fibers embedded in the thermoplastic resin into discrete finite lengths, means for mixing the resulting fibers and resin and means for forming the mixture into a new sheet of thermoplastic resin material suitable for many commercial uses. The tearing of the textile fibers embedded in the scrap into minute lengths is accomplished by means for applying shearing force to the opposite surfaces of the segments of scrap, in directions parallel to the surfaces.

12 Claims, 1 Drawing Figure

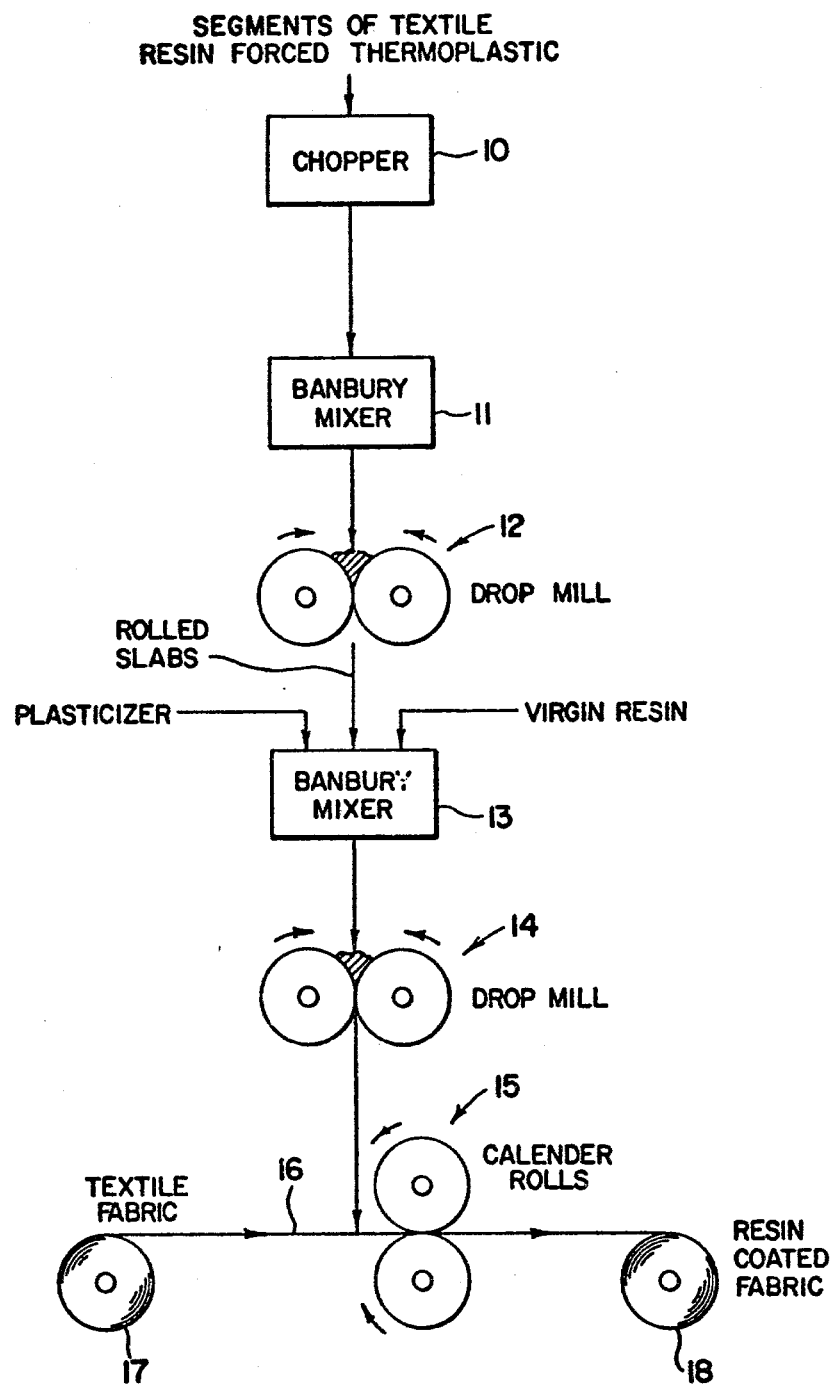

APPARATUS FOR REPROCESSING SCRAP FROM FABRIC REINFORCED THERMOPLASTIC SHEET

This is a division, of application Ser. No. 451,390 filed Mar. 15, 1974, now abandoned.

BACKGROUND OF THE INVENTION

This invention relates to the manufacture of thermoplastic resin sheet material such as vinyl coated fabrics, expanded vinyl sheet and other plastic roll goods. More particularly, the invention relates to the reclaiming or reprocessing of scrap material produced in the manufacture of various plastic roll goods, especially scrap that contains reinforcing textile fabric.

Enormous amounts of scrap are generated during the manufacture of textile fabric reinforced thermoplastic resin sheet material (hereinafter "reinforced sheet"). This scrap includes, for example, selvedge trim—strips trimmed from the sides of a long sheet to eliminate edge irregularities and to provide the desired lateral dimension. This scrap is difficult to dispose of and usually requires the services of an industrial waste contractor. This service is costly, particularly because space for such disposal is increasingly difficult to find.

While thermoplastic sheet material that has no textile fabric reinforcement may be readily reprocessed merely by mixing the scrap with virgin material and processing it according to standard practices, these same techniques cannot be readily adapted to scrap from reinforced sheet because of the fabric backing. The woven fibers prevent the material from banding on a mill and thus it cannot be calendered.

Certain methods have been developed for reprocessing scrap from reinforced sheet by chopping it into small pieces and then removing altogether a substantial amount of the textile fibers, such as by a vacuum process as disclosed in U.S. Pat. No. 3,562,373 of Logrippo. These methods are costly and time-consuming, however, and they in turn also produce scrap in the form of the removed textile fibers that must be disposed of. Accordingly, they are not feasible from an economic point of view and do not completely eliminate the problem of disposal.

The method and apparatus of the present invention, however, reduce the difficulties indicated above and afford other features and advantages heretofore not obtainable.

SUMMARY OF THE INVENTION

It is among the objects of the invention to reprocess scrap produced during the manufacture of reinforced sheet.

Another object is to eliminate the need for disposal of scrap produced during the manufacture of reinforced sheet.

Still another object is to break down fibers of the fabric contained in scrap produced in the manufacture of reinforced thermoplastic sheet into discrete finite lengths sufficiently small that the fiber-containing scrap can be banded and calendered or extruded so as to facilitate the reprocessing thereof into commercial products.

Other objects and advantages are accomplished according to the method and apparatus of the invention by applying a shearing force parallel to the surfaces of segments of scrap of the type described above so as to rupture and tear the fabric fibers into lengths no greater than about 0.25 inch. This forms a mixture of thermoplastic resin and short lengths of fabric fibers. The resulting mixture is subjected to heat and pressure, such as by a drop mill and thus banded.

The application of shearing force can be accomplished, for example, in a Banbury mixer or in a tight cold mill as one element of the apparatus in combination.

After the mixture is banded as described, it can be calendered onto a web of fabric to form a finished reinforced sheet or extruded into various continuous forms such as sheets or strips.

The invention is particularly useful as applied to scrap polyvinyl chloride sheet material reinforced with cotton fabric. However, it can also be used advantageously with such sheet material reinforced with polyester or other fabric, woven or non-woven, including glass fiber matting.

In accordance with one embodiment of the invention, means are provided as an element of the apparatus to mix the banded mixture with virgin resin and plasticizer before being calendered or extruded to form the final product.

BRIEF DESCRIPTION OF THE DRAWINGS

FIG. 1 is a schematic diagram in block form illustrating a preferred method and apparatus embodying the invention for reprocessing scrap derived from the manufacture of reinforced sheet.

DESCRIPTION OF THE PREFERRED EMBODIMENT

As indicated above, the successful reprocessing of scrap produced during the manufacture of reinforced sheet is accomplished in accordance with the invention by applying shearing force to opposite surfaces of a segment of scrap progressively throughout the entire surface area thereof in such a way as to progressively tear the fabric into discrete fibers of finite length. The scrap segments come from a calendered trim station or from a jet-oven trim station; and while this scrap can be worked directly from its original form, it is preferable that it be cut or chopped into small pieces to facilitate handling.

The preferred form of the process and apparatus is illustrated in FIG. 1 wherein it will be seen that the scrap is initially delivered to a chopper 10. The chopping or cutting operation should be performed in such a way as to avoid tearing the strands or yarns apart so that the bulk density is not increased due to the development of lint or "fuzz balls".

The chopped scrap is then delivered to a Banbury mixer 11 of the type well known to those skilled in the art. Due to the heat produced in the operation, the Banbury should be provided with sufficient cooling capability. While a Banbury mixer is schematically illustrated in the embodiment of the invention described herein, the operation can be performed on a tight cold mill as well or on a standard rubber refining mill. A working time of from 1 to 5 minutes in a tight cold mill or in a Banbury is usually sufficient to produce a mixture wherein the fibers are sufficiently ruptured and then into minute lengths small enough to permit the product to be calendered or extruded. In a tight cold mill the gap should be set at between 0.015 and 0.025 inch. While only one minute's working time is sufficient to break down the fibers to the point that the mixture may be banded and calendered, further working for up to 20 minutes will give a maximum fiber breakdown resulting in optimum surface appearance in the resulting product.

The temperature in the Banbury or the tight cold mill 11 should be carefully controlled in order to achieve the optimum rupturing and tearing of the fibers. If the temperature is too high, the working merely strips the coating off the fabric without rupturing or tearing the fabric. The best fiber breakdown is accomplished where the Banbury jacket temperature is maintained at 90° F. However, satisfactory working can be achieved with a 140° F. jacket temperature. Tests conducted with a jacket temperature of 210° F. indicated poor fiber breakdown and produced a mixture after several minutes' working that could not be banded. Where higher jacket temperatures are used, sufficient mixing times cannot be achieved due to the excessive temperature buildup in the scrap being worked.

The mixture of resin and finite fiber particles from the Banbury mixer 11 is delivered to a drop mill 12 of the type well known in the art wherein a pair of rolls are closely spaced from one another and turned to squeeze the material therebetween and feed out slabs of rolled and banded material.

Apparatus which has been used in the practice of the present invention includes a Banbury made by Farrel-Birmingham, Banbury made at Ansonia, Conn. Derby, Conn., and Buffalo, N.Y. A plate on the Banbury has reference to the following U.S. Pat. Nos. 1,370,398, 1,390,975, 1,512,813, 1,516,483, 1,518,129, 1,523,387, 1,536,466, 1,552,666, 1,689,990, 1,818,448, 1,881,994, 1,905,455, 1,928,377, 1,937,659, 2,299,502, 2,446,657, 2,615,689, 2,680,264 and 2,705,653.

A drop mill which has been used includes the model 42 laboratory mill manufactured in November 1951 by the National Rubber Machining Corporation Akron, Oh. The mill is called a drop mill because it is usually positioned below a Banbury and the load from the Banbury is dropped onto the mill.

The material was cut into pieces small enough to be inserted into the Banbury using ordinary scissors. The Banbury was cooled using cooling water. Banburys generally are capable of being cooled by cooling water.

The time that the Banbury load was subjected to shearing force was measured using an ordinary wristwatch.

The material was carried from station-to-station by hand. Pressure is applied in the drop mill and the mill rolls are heated by hot oil or steam.

All of the equipment which was used is equipment that is normally used in the manufacture of flexible fabric backed vinyl sheets. This is well-known to persons or ordinary skill in the field.

The virgin resin binder was added using a container such as a bucket or a scoop. Virgin resin is pelletized.

In accordance with the preferred embodiment illustrated in FIG. 1, the rolled slabs from the drop mill 12 are mixed with a quantity of virgin resin and plasticizer received within a second Banbury mixer 13. It should be noted that this step is not essential to the practice of the invention and that the rolled slabs from the drop mill 12 can be extruded or calendered without further modification depending upon the product desired. The addition of virgin resin and plasticizer, however, achieves somewhat improved results. Also, unsupported scrap can be added to the Banbury mixer 13, i.e., scrap from thermoplastic resin sheet material that has not been reinforced with textile fabric. The plasticizer added to the Banbury mixer 13 can be, for example, di-2-ethylhexyl phthalate or the like. Other thermoplastic resins that may be added include acrylic copolymers, acrylo-butadiene-styrene, poly alpha methyl styrene or styrene copolymers. From the Banbury mixer 13 the resulting mixture is delivered to another drop mill 14 which performs the same function as the drop mill 12 and delivers rolled or banded slabs.

The slabs from the drop mill 14 are delivered, for example, to a calender station wherein calender rolls 15 are used to coat a web 16 of textile fabric that is fed from a reel 17, passed between the calender rolls 15 to apply the resin, and rolled on a take-up reel 18.

The method and apparatus of the invention achieves the best results with reinforced sheet wherein the fiber content is between 10 and 30 percent by weight. However, almost any reinforced sheet can be reprocessed according to the invention. Where the fiber content exceeds 30 percent by weight, certain difficulties are encountered in handling during breakdown of the fibers due to insufficient binder. This can result in a discontinuous sheet or slab being fed from the drop mill. This difficulty can be resolved by reducing the amount of fiber content by weight by mixing in with the high-fiber-content material a material having a much lower fiber content to achieve an optimum level of 20 percent or less. An alternate method would be to mix in unsupported scrap or virgin resin as described above in order to achieve the optimum fiber content.

While FIG. 1 describes a specific application of the invention wherein the banded mixture of fibers and resin is calendered between rolls 15 onto a web 16 of textile fabric, in some circumstances the banded mixture can be extruded. Current indications are that the fiber content of a banded mixture for use in extruding applications is about 20 percent.

While the invention can be used in connection with many types of thermoplastic resins, its use in connection with reinforced polyvinyl chloride sheet material appears to be the most advantageous at the present time. The types of vinyl products that can be made from the scrap produced in the manufacture of reinforced vinyl sheet include matting of all types, automobile carpet underlay, substrates for vinyl coatings, boat decking, Landau sheeting, wall coverings and deeply embossed sheeting for many applications. While the textile fabric most often used to reinforce vinyl sheet material is cotton fabric, other fabrics both woven and non-woven, are included within the scope of the method of the invention. Also, in addition to the solid-type vinyl sheeting, it has been found that expanded vinyl sheet, either reinforced or unreinforced, can also be produced from reinforced vinyl sheet scrap. The scrap that has been worked in accordance with the invention has the unique property of being processible at the low calender temperatures necessary to prevent decomposition of the blowing agent used in the manufacture of expanded vinyl sheeting. Production of expanded vinyls greatly enlarges the potential for use of the invention.

The invention may be better understood by referring to the following examples that are representative of applications of the method of the invention.

EXAMPLE I

Scrap from vinyl sheet material reinforced with cotton fabric comprising about 18% by weight of the product was worked in accordance with the invention on a cold tight rubber refining mill for about 2 minutes. The resulting mixture of minute fibers and vinyl was then processed in separate portions according to three different procedures. In the first instance, the mixture was simply banded and calendered into an unsupported sheet. In the second instance, the mixture was mixed in a second Banbury pass with vinyl scrap from unsupported vinyl sheet to produce a composite mixture of 80% by weight of the fiber-vinyl mixture and 20% by weight of the unsupported vinyl scrap. The composite mixture was then banded and calendered as described above. In the third instance, the mixture of minute fibers and vinyl was mixed in a second Banbury pass with vinyl scrap from unsupported vinyl scrap to produce a composite mixture of 67% by weight of the fiber-vinyl mixture and 33% by weight of the unsupported vinyl scrap. The composite mixture was then banded and calendered as described above. Finally, a quantity of the vinyl scrap from the unsupported vinyl sheet was banded and calendered in the same manner.

The four finished vinyl sheet products were each subjected to physical tests for tensile strength, elongation (%), Graves tear strength, and abrasion resistance using a CS17 abrasion wheel set at 1000 cpm and at a 1000 gm load. The tests were conducted according to procedures well known in the art and the results are set forth in Table I below.

TABLE I

| Portions | Tensile Strength (psi) | Elongation (%) | Graves Tear (lb/in.) | Abrasion (gm. wt. Loss) |
|---|---|---|---|---|
| 100% reinforced scrap | 1235/823 | 9/23 | 186/233 | .089 |
| 80% reinforced scrap 20% unsupported scrap | 968/818 | 131/192 | 149/243 | .068 |
| 67% reinforced scrap 33% unsupported scrap | 1142/735 | 178/300 | 239/247 | .053 |
| 100% unsupported scrap | 1916/1811 | 519/545 | 220/230 | .022 |

EXAMPLE II

The second run of Example I was repeated in a production plant except that the composite mixture of 80% by weight of the fiber-vinyl mixture and 20% by weight of the unsupported vinyl scrap was calendered onto fabrics. The finished vinyl sheet products were subjected to the same physical tests for tensile strength, elongation and Graves tear strength with the following results:

TABLE II

| Fabric | Tensile Strength (psi) | Elongation (%) | Graves Tear (lb/in.) |
|---|---|---|---|
| Knit | 1430/530 | 34/170 | 235/145 |
| Drill | 1880/1300 | 11/18 | 193/163 |

EXAMPLE III

Scrap from reinforced vinyl sheet having a fiber content by weight of about 20% was worked in a cold tight mill having a gap setting of between 0.015 and 0.020 inch for about 5 minutes and the resulting mixture of fibers and vinyl was mixed with unsupported vinyl scrap to form a composite mixture comprising 80% by weight of fiber and vinyl mixture and 20% by weight of unsupported scrap. The resulting composite mixture was placed on a drop mill (at a temperature of about 280° F.) and banded. Azodicarbonamide

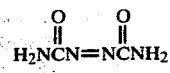

a blowing agent sold commercially under the trade designation "KEMPORE SD-125", was added in a portion of 4 pph and processed for 5 minutes. A portion of the resulting product was expanded in a press to form an expanded vinyl product. The resulting expanded vinyl sheet was then measured for thickness and subjected to physical tests for tensile strength, elongation, and trapezoid tear. The test results are set forth in Table III below.

TABLE III

| Thickness (inches) | Tensile Strength (psi) | Elongation (%) | Trapezoid Tear (lbs.) |
|---|---|---|---|
| .115 | 353 | 30 | 6.5 |

Another portion of the mixture containing the blowing agent in a proportion of 2 pph was calendered into a sheet having a thickness of about 0.015 inch and then press-laminated onto a cotton knit fabric and expanded in a circulating hot air oven. The expanded sheeting had good cell structure and satisfactory physical properties.

While the method and apparatus of the invention have been shown and described in connection with specific embodiments thereof, this is intended for the purpose of illustration rather than limitation, and other variations and modifications thereof will be apparent to those skilled in the art all within the intended spirit and scope of the invention. Accordingly, the patent is not to be limited in scope or effect to the specific forms herein shown and described nor in any other way that is inconsistent with the extent to which the progress in the art has been advanced by the invention.

We claim:

1. Apparatus for forming a usable thermoplastic resin product containing short fibers from a fabric backed thermoplastic resin sheet material consisting essentially of
    (a) means for forming fabric reinforced resin sheet material segments which are free of lint and fuzz of a size suitable for feeding the sheet material into a shearing force means;
    (b) means for applying shearing force to said segments parallel to the surfaces thereof to tear said fabric into short-length fibers having lengths no greater than about 0.250 inch and to mix said thermoplastic resin and said short-length fibers wherein said means for applying said shearing force is adapted to be maintained at a temperature of below about 140° F. and wherein said shearing force is adapted to be applied for a time of between about 1 and 20 minutes; and (c) means for applying heat and pressure to said mixture of thermoplastic and fibers formed on the shearing means to form a length of thermoplastic resin product material therefrom.

2. Apparatus as defined in claim 1 further including means to mix a selected quantity of thermoplastic resin with said mixture before said mixture is introduced into said means for applying heat and pressure.

3. Apparatus as defined in claim 2 wherein said means for applying heat and pressure is adapted to extrude said resin product wherein the content of the short-length fibers is no more than about 20% by weight.

4. Apparatus as defined in claim 2 wherein a blowing agent is included with said thermoplastic resin and adapted to form an expanded sheet material.

5. Apparatus as defined in claim 1 wherein said thermoplastic resin is polyvinyl chloride.

6. Apparatus as defined in claim 2 wherein said fabric material is cotton fabric.

7. Apparatus as defined in claim 1 wherein said fabric is fiberglass.

8. Apparatus as defined in claim 5 further including means to calender said thermoplastic resin product onto a fabric web to form a sheet of fabric-reinforced thermoplastic resin.

9. Apparatus as defined in claim 2 wherein said means to mix said thermoplastic resin includes means to mix a selected amount of a plasticizer into said mixture with said thermoplastic resin.

10. An apparatus for processing scrap fabric backed vinyl sheet into reusable product consisting essentially of (a) a high shear cold mill for breaking up the fabric backing into fibers and mixing the fibers with the vinyl component of the scrap comprising two rotatably supported rolls having a gap between the two rolls of from 0.015 to 0.025 inch, the temperature of the rolls being no greater than 140° F.;

(b) a drop mill having a pair of rolls which forms slabs from the material which has passed through the high shear cold mill; and (c) a calender having a plurality of rolls which forms the slabs from the drop rolls into a sheet and applies it to a fabric backing.

11. The apparatus of claim 10 having a Banbury mixer for further mixing the fibers and thermoplastic output of the cold mill.

12. An apparatus for processing scrap fabric backed vinyl sheet into reusable product consisting essentially of (a) a Banbury mixer for breaking up the fabric backing into fibers and mixing the fibers with the vinyl component of the scrap the temperature of the mixer being no greater than 140° F.;

(b) a drop mill having a pair of rolls which forms slabs from the material which has passed through the Banbury mixer; and (c) a calender having a plurality of rolls which forms the material from the drop rolls into a sheet and applies it to a fabric backing.

* * * * *